(12) United States Patent
Fish et al.

(10) Patent No.: US 11,644,071 B2
(45) Date of Patent: May 9, 2023

(54) ROTOR DRIVE KEY ASSEMBLY

(71) Applicant: Honeywell International Inc., Morris Plains, NJ (US)

(72) Inventors: Bradley E. Fish, Elkhart, IN (US); Jonathan T. Beehler, Bremen, IN (US); Andrew S. Haynes, New Carlisle, IN (US)

(73) Assignee: Honeywell International Inc., Charlotte, NC (US)

( * ) Notice: Subject to any disclaimer, the term of this patent is extended or adjusted under 35 U.S.C. 154(b) by 310 days.

(21) Appl. No.: 16/910,307

(22) Filed: Jun. 24, 2020

(65) Prior Publication Data

US 2021/0010549 A1 Jan. 14, 2021

Related U.S. Application Data

(60) Provisional application No. 62/871,534, filed on Jul. 8, 2019.

(51) Int. Cl.
| | | |
|---|---|---|
| *F16D 65/12* | (2006.01) | |
| *F16D 65/84* | (2006.01) | |
| *F16D 65/02* | (2006.01) | |
| *F16D 65/78* | (2006.01) | |

(52) U.S. Cl.
CPC .............. *F16D 65/12* (2013.01); *F16D 65/84* (2013.01); *F16D 2065/138* (2013.01); *F16D 2065/1364* (2013.01); *F16D 2065/1372* (2013.01); *F16D 2065/1392* (2013.01); *F16D 2065/785* (2013.01)

(58) Field of Classification Search
CPC .... F16D 2065/138; F16D 65/12; F16D 65/84; F16D 2065/1364; F16D 2065/1372; F16D 2065/1392; F16D 2065/785; B60C 23/18
See application file for complete search history.

(56) References Cited

U.S. PATENT DOCUMENTS

| | | | |
|---|---|---|---|
| 3,191,735 | A | 6/1965 | Wavak |
| 3,754,624 | A | 8/1973 | Eldred |
| 3,958,833 | A | 5/1976 | Stanton |
| 3,983,974 | A | 10/1976 | Dowell et al. |

(Continued)

FOREIGN PATENT DOCUMENTS

| | | |
|---|---|---|
| EP | 1842693 A1 | 10/2007 |
| EP | 3184422 A1 | 6/2017 |
| GB | 1402535 A | 8/1975 |

OTHER PUBLICATIONS

Extended Search Report from counterpart European Application No. 20183826.5, dated Oct. 14, 2020, 7 pp.

(Continued)

*Primary Examiner* — Nicholas J Lane
*Assistant Examiner* — Mahbubur Rashid
(74) *Attorney, Agent, or Firm* — Shumaker & Sieffert, P.A.

(57) ABSTRACT

In some examples, an assembly includes a rotor drive key configured to fit around a wheel boss defined by a wheel of a vehicle. The rotor drive key includes a support member. The assembly further comprises a fastener configured to extend through the wheel boss and the support member in a substantially axial direction of the wheel when the rotor drive key is fit around the wheel boss. A fastening member is configured to engage with a portion of the fastener extending beyond the support member.

20 Claims, 9 Drawing Sheets

(56) References Cited

U.S. PATENT DOCUMENTS

| | | | |
|---|---|---|---|
| 4,084,857 A | | 4/1978 | VanderVeen |
| 4,195,714 A | | 4/1980 | Massing |
| 4,383,594 A | | 5/1983 | Correll et al. |
| 5,024,297 A | | 6/1991 | Russell |
| 5,186,521 A | * | 2/1993 | Niespodziany ......... F16D 65/84 188/264 G |
| 5,348,122 A | | 9/1994 | Brundrett |
| 5,851,056 A | * | 12/1998 | Hyde ..................... B60B 19/10 188/264 G |
| 6,003,641 A | | 12/1999 | Boehringer et al. |
| 6,808,050 B2 | * | 10/2004 | Lehmann ................ F16D 65/12 188/218 XL |
| 7,488,044 B2 | * | 2/2009 | Scelsi .................... B64C 25/36 301/6.2 |
| 8,157,062 B2 | | 4/2012 | Enright et al. |
| 8,430,457 B2 | * | 4/2013 | Baldassara ............. F16D 65/00 188/71.6 |
| 9,919,794 B2 | * | 3/2018 | Rook ...................... B64C 25/36 |
| 9,938,003 B2 | * | 4/2018 | Rook ...................... F16D 65/827 |
| 2007/0236076 A1 | * | 10/2007 | Tong ....................... F16F 15/32 301/5.21 |
| 2007/0246995 A1 | * | 10/2007 | Scelsi .................... B64C 25/36 301/6.1 |
| 2010/0025172 A1 | * | 2/2010 | Campbell ............... F16D 65/12 188/264 G |
| 2017/0174330 A1 | * | 6/2017 | Rook ...................... F16D 55/36 |
| 2019/0120304 A1 | * | 4/2019 | Laget ..................... B60T 1/062 |
| 2019/0331178 A1 | * | 10/2019 | Steele .................. C23C 24/103 |
| 2020/0102069 A1 | | 4/2020 | Beehler et al. |

OTHER PUBLICATIONS

Response to Extended Search Report dated Oct. 14, 2020, from counterpart European Application No. 20183826.5, filed Nov. 12, 2020, 37 pp.

U.S. Appl. No. 16/832,868, by Honeywell International, Inc. (Inventors: Fish et al.), filed Mar. 27, 2020.

U.S. Appl. No. 16/799,392, by Honeywell International, Inc. (Inventor: Fish), filed Feb. 24, 2020.

U.S. Appl. No. 16/843,494, by Honeywell International, Inc. (Inventor: Fish et al.), filed Apr. 8, 2020.

"Wheels and Braking Systems," Honeywell International, Inc., accessed from aerospace.honeywell.com, C61-1547-000-000 I 04/16, accessed on Aug. 7, 2019, (Applicant points out, in accordance with MPEP 609.04(a), that the year of publication, 2016, is sufficiently earlier than the effective U.S. filing date, so that the particular month of publication is not in issue.), 4 pp.

Notice of Intent to Grant and Text Intended to Grant from counterpart European Application No. 20183826.5, dated Mar. 18, 2021, 42 pp.

* cited by examiner

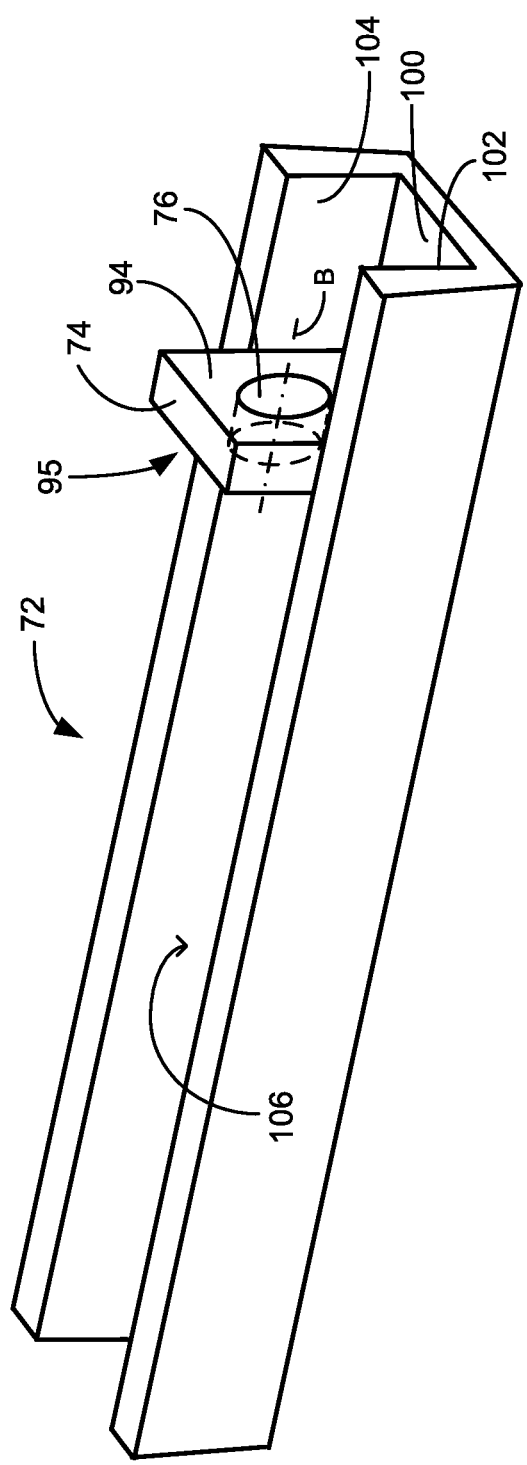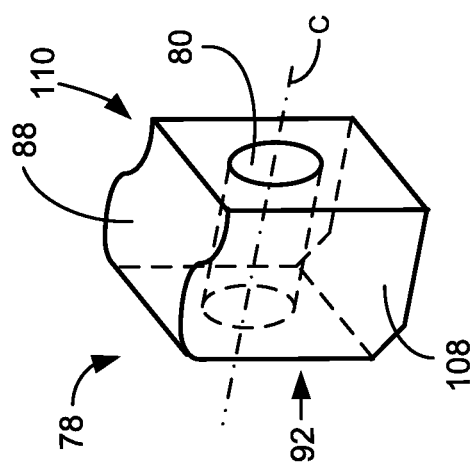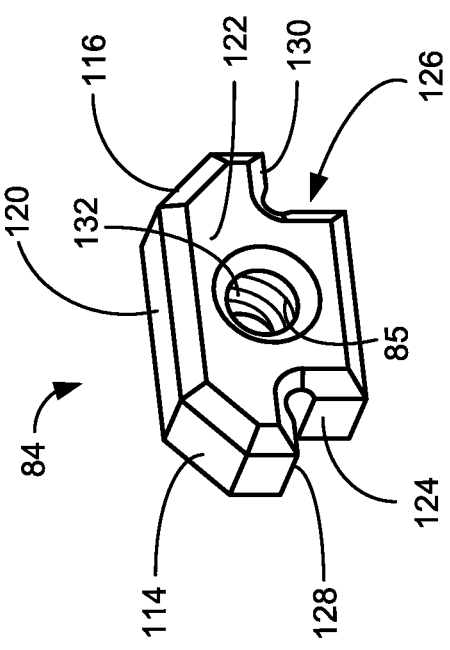

ROTOR DRIVE KEY ASSEMBLY

This application claims the benefit of U.S. Provisional Patent Application Ser. No. 62/871,534 (filed Jul. 8, 2019), which is entitled, "ROTOR DRIVE KEY ASSEMBLY" and is incorporated by reference herein in its entirety.

TECHNICAL FIELD

The present disclosure relates to wheel brake systems of a vehicle, and in particular, rotor drive key assemblies for wheel brake systems of a vehicle.

BACKGROUND

Vehicles, such as aircrafts, may use a wheel brake system that includes a multi-disc brake assembly. For example, the multi-disc brake assembly may include a plurality of rotors engaged with a wheel and a plurality of stators interleaved with the rotors. The rotors and wheel are configured to rotate around an axle, while the stators remain stationary. To decelerate rotational motion of a rotating wheel, the brake assembly may displace pistons against a pressure plate to squeeze the rotating rotors engaged with the wheel against the stationary stators, therefore producing torque that decelerates the rotational motion of the wheel. In some examples, the rotors may be engaged with the wheel via rotor drive keys positioned on an interior surface of the wheel. In some such examples, the rotors may define slots configured to receive the rotor drive keys.

SUMMARY

In some examples, an assembly includes a rotor drive key configured to fit around a wheel boss defined by a wheel. The rotor drive key defines a support member. The assembly further comprises a fastener configured to extend in a substantially axial direction of the wheel through the wheel boss and the support member when the rotor drive key is fit around the wheel boss. The fastener is configured to engage with a fastening member, such that the wheel boss and the support member are between a head of the fastener and the fastening member. In some examples, the support member and the wheel boss each defines a bearing surface, and the bearing surfaces are configured to contact each other when the rotor drive key is fit around the wheel boss. The bearing surfaces may be planar or otherwise complementary in some examples. In addition, in some examples, the rotor drive key comprises a trough configured to at least partially surround the wheel boss, the support member, and the fastening member.

In some examples, the fastening member comprises a first bearing surface and the support member comprises a second bearing surface. The first bearing surface and the second bearing surface are planar or otherwise complementary in some examples. In some examples, the fastening member comprises one or more arms configured to extend between the trough and an interior surface of the wheel when the fastening member is engaged with the fastener, providing additional axial stability to a heat shield lining some portion of the interior surface of the wheel. In examples, the axially aligned fastener is configured to act or cause other components of the assembly to act as an anchor to the rotor drive key, and the rotor drive key is cantilevered within the wheel in a substantially axial direction of the wheel.

In one example, this disclosure is directed to a rotor drive key configured to be positioned over a wheel boss of a wheel, wherein the rotor drive key defines a support member, a fastener configured to extend through the wheel boss and the support member in a substantially axial direction of the wheel when the rotor drive key is positioned over the wheel boss, wherein a fastening section of the fastener extends beyond the support member when the fastener extends through the wheel boss and the support member, and a fastening member configured to engage with the fastening section.

In another example, the disclosure is directed to an assembly comprising a vehicle wheel comprising a wheel boss defining a boss aperture, a rotor drive key configured to position over the wheel boss, wherein the rotor drive key comprises a support member defining a support member aperture configured to align with the boss aperture in a substantially axial direction of the wheel, a fastener comprising a fastener head at a first end and fastening section at a second end, the fastener configured to extend through the boss aperture and the support member aperture such that the wheel boss is in between fastener head and the support member, and such the fastening section extends beyond the support member aperture, and a fastening member configured to engage with the fastening section to secure the fastener in place relative to the rotor drive key.

In another example, the disclosure is directed to a method including placing a rotor drive key comprising a support member around a wheel boss of a vehicle wheel, extending a fastener in an axial direction of the wheel through a boss aperture defined by the wheel boss and a support aperture defined by the support member until a fastening section of the fastener extends beyond the support member, and engaging a fastening member with the fastening section.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is an isometric view of an example rotor drive key including a support member.

FIG. 6 is a perspective view of an example fastening member including first and second arms.

FIG. 7 is an isometric view of a section of an example wheel boss.

DETAILED DESCRIPTION

Figure 1:
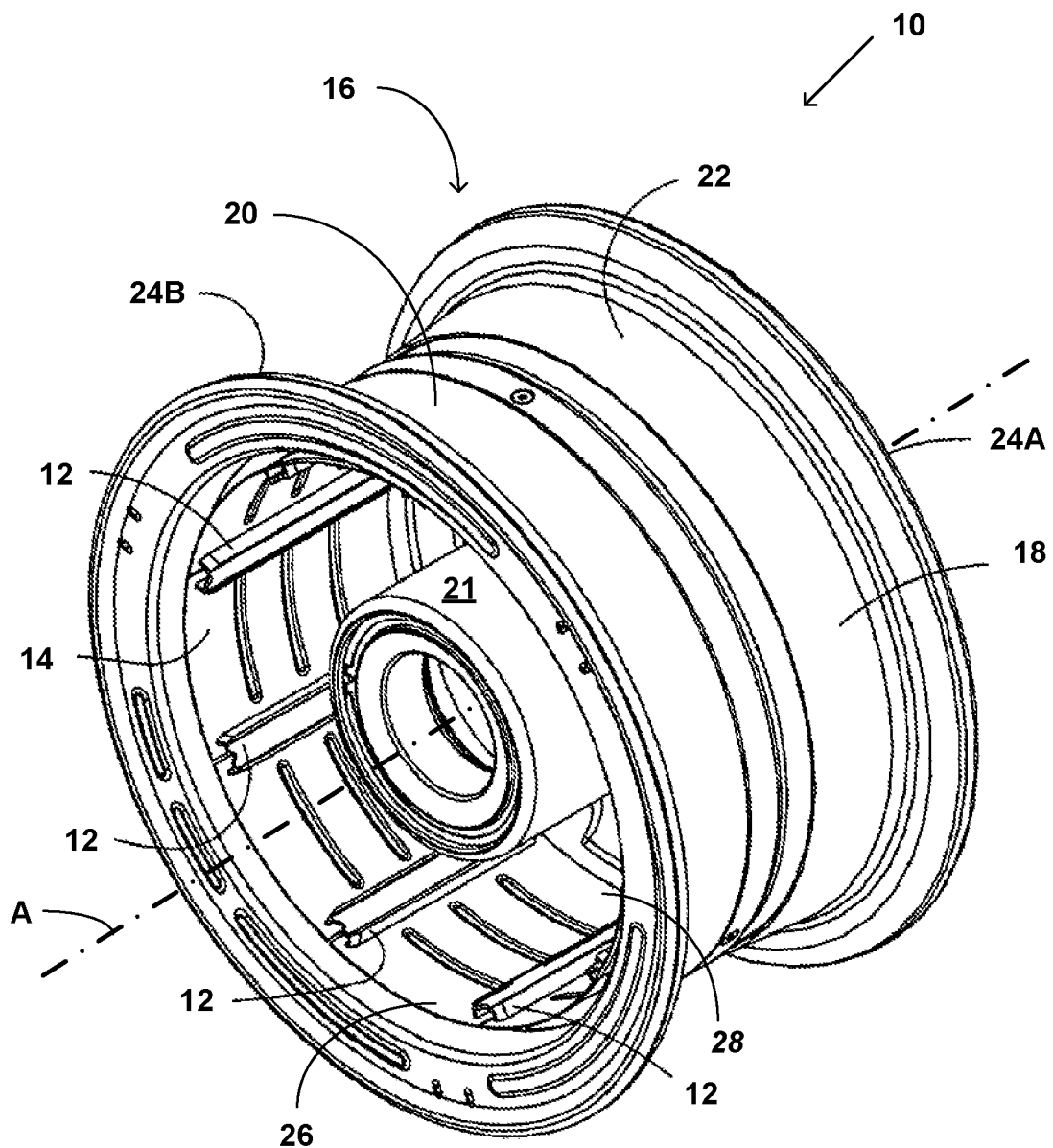
FIG. 1 is a perspective view illustrating an example wheel including a plurality of rotor drive keys on an interior surface of the wheel.

The disclosure describes articles, systems, and techniques relating to rotor drive keys of a wheel brake system of a vehicle. The rotor drive keys described herein are configured to be attached to an interior surface of a wheel, and, in particular, to a wheel boss defined by an interior surface of the wheel with the aid of a fastener (e.g., an elongated fastener, such as a bolt) that is configured to extend through the wheel boss and a support member of the rotor drive key in a substantially axial direction of the wheel. The substantially axial direction of the fastener can be, for example, an axial direction of the wheel, a nearly axial direction of the wheel to the extent permitted by manufacturing tolerances, or within 45 degrees of the axial direction of the wheel. In examples, the substantially axial direction of the fastener is within 30 degrees, 10 degrees, or 5 degrees of the axial direction of the wheel.

The wheel boss and the support member may each include a bearing surface and may each define an aperture that extends through the wheel boss and the support member, respectively. The apertures of the wheel boss and the support member may be configured to align when the rotor drive key is fit on the wheel boss. A fastener may be inserted in a substantially axial direction (e.g., axial or nearly axial to the extent permitted by manufacturing tolerances) of the wheel through the aligned apertures to place the wheel boss bearing surface and the support member bearing surface in contact, and to attach the rotor drive key to the wheel. For example, the fastener may be inserted in a direction along a length of the rotor drive key. In some examples, a portion of the rotor drive key may be configured to complement a portion of the wheel boss, or vice versa, to provide additional axial, radial, or tangential stability to the rotor drive key during rotation or braking of the wheel.

The fastener comprises a fastener head at a first end and a fastening section at a second end, and may be extended through the wheel boss and the support member of the rotor drive key such that at least some portion of the fastening section extends beyond the support member. The fastening section may be engaged with a fastening member, such that the wheel boss and the support member are between the head of the fastener and the fastening member. For example, the fastening section may define a set of external threads configured to threadably engage a set of internal threads defined by the fastening member. The fastening member may include a bearing surface configured to contact and frictionally engage a bearing surface of the support member.

In some examples, the rotor drive key defines a trough configured to surround some portion of the wheel boss, the support member, and the fastening member when the rotor drive key is fit around the wheel boss. The trough may be configured to substantially conform with the portion of the wheel boss, which may provide radial and tangential stability to the rotor drive key during operation and braking of the wheel, among other advantages. The fastening member may include one or more arms that are configured to extend out of the trough when the fastening member is engaged with the fastener, where the one or more arms are configured to be positioned between the trough and an interior surface of the wheel when the fastening member is installed on the fastener while the rotor drive key is positioned over the wheel boss. This may provide further radial stability to the rotor drive key. In examples, the one or more arms are configured to provide axial support to a heat shield within the wheel.

The wheel boss, the rotor drive key, the fastener, and the fastening member may form an assembly in which the bearing surface of the wheel boss frictionally engages a first bearing surface of the support member of the rotor drive key, while a bearing surface of the fastening member frictionally engages a second bearing surface of the support member of the rotor drive key. The rotor drive key may be secured to the wheel boss by the axially extended fastener engaged with the fastening member, such that the rotor drive key is cantilevered in a substantially axial direction of the wheel.

Some rotor drive keys are attached to an interior surface of a wheel using a fastener, such as a bolt, extending exclusively in a radial direction of the wheel. For example, a bolt may be configured to be inserted through a first aperture defined by a rotor drive key and a second aperture defined by a rim (e.g., a wheel boss) of a wheel. Rotor drive keys may be subject to heat cycling, vibration, or other conditions during use, which may result in the nut and/or the bolt loosening over time. This may decrease the useful life of the rotor drive key and/or wheel, interrupt the function of the braking assembly for the wheel, increase maintenance costs, result in premature replacement of the rotor drive key, or the like. In examples in which a nut loosens or disengages, the rotor drive keys of such assemblies may not include any other mechanism to help contain the nut, potentially leading to interference with other components which may be within the wheel assembly.

Example rotor drive keys described herein are configured to be attached to the interior surface of a wheel using a fastener that is substantially aligned (e.g., aligned or nearly aligned to the extent permitted by manufacturing tolerances) with an axial direction of the wheel, which may result in the fastener being less likely to loosen during operation of the wheel or braking system (e.g., due to heat cycling, vibration, or other operating conditions) in comparison to other rotor drive key assemblies that include fasteners extending in a radial direction of the wheel. Moreover, in some examples, the rotor drive key may include bearing surfaces complementary to a bearing surface on a wheel boss and a fastening member, which may provide additional axial, radial, or tangential stability to the rotor drive key during rotation or braking of the wheel. Further, the rotor drive key may be configured (e.g., to define a trough) to provide containment of the fastening member should the fastening member detach from the fastener during operation of a vehicle with which the rotor drive key is used. As a result, movement of the rotor drive key relative to the wheel during operation of the vehicle including the wheel may be reduced or even prevented.

FIG. 1 is a perspective view illustrating an example wheel 10 including a plurality of rotor drive keys 12 on an interior surface 14 of wheel 10. In some examples, wheel 10 is a part of an aircraft vehicle. In other examples, wheel 10 may be a part of any other vehicle, such as, for example, any marine vessel, land vehicle, or other vehicle. Wheel 10 may include a rim 16 defining an exterior surface 18 and interior surface 14. Rim 16 may include tubewell 20, wheel hub 21, and wheel outrigger flange 22. In some examples, interior surface 14 may include an inner diameter of tubewell 20 of wheel 10. For example, in some cases, interior surface 14 may be referred to as an inner diameter surface of wheel 10.

In some examples, a tire (not shown) may be mounted on exterior surface 18 of rim 16. For example, wheel 10 may include an inboard bead seat 24B and an outboard bead seat 24A configured to retain a tire on exterior surface 18 of rim 16.

Wheel 10 is configured to engage with one or more rotors (not shown in FIG. 1) of a braking assembly. For example, as shown in the example of FIG. 1, a plurality of rotor drive keys 12 are positioned along interior surface 14, and each rotor drive key of the plurality of rotor drive keys 12 may be configured to engage with one or more rotors of a brake disc stack of a braking assembly. An example braking assembly will be described in more detail with respect to FIG. 2.

In some examples, each rotor drive key of the plurality of rotor drive keys 12 extends in a substantially axial direction of wheel 10 (e.g., in a direction parallel to the axis label "A" in FIG. 1, which can be an axis of rotation of wheel 10). For example, a length of each rotor drive key of the plurality of rotor drive keys 12 may extend in the substantially axial (e.g., axial or nearly axial to the extent permitted by manufacturing tolerances) direction of the axis A. In some such examples, the respective length of each rotor drive key 12 may extend from (or near) a first edge 26 of wheel 10 to (or close to) a second edge 28 of wheel 10. In this way, in some examples, a length of a rotor drive key 12 of the plurality of rotor drive keys 12 may be the same or substantially similar to (e.g., within 10%) a width of wheel 10 from first edge 26 to second edge 28. In other examples, a length of a rotor drive key 12 may be less than the width of wheel 10.

The plurality of rotor drive keys 12 extending in the substantially axial direction may enable wheel 10 to slide onto a braking assembly. For example, a plurality of rotors of a braking assembly may include drive slots configured to receive the plurality of rotor drive keys 12, enabling the plurality of rotor drive keys 12 to be slid into respective drive slots of the plurality of rotors. In other examples, one or more rotor drive keys of the plurality of rotor drive keys 12 may be oriented in a different direction and/or may engage with one or more rotors in a different manner.

The plurality of rotor drive keys 12 may include any suitable number of rotor drive keys. The number of drive keys may be vehicle specific and may depend on, e.g., loads, size of parts, material property, and the like. In some examples, the number of the rotor drive keys included in the plurality of rotor drive keys 12 may correspond to a number of drive slots defined by a plurality of rotors of a braking assembly configured to receive the plurality of rotor drive keys 12. For example, each rotor drive key of the plurality of rotor drive keys 12 may correspond to a respective slot defined by the plurality of rotors of a braking assembly.

As illustrated in the example of FIG. 1, in some examples, the plurality of rotor drive keys 12 may be mounted at substantially equal circumferential distances around interior surface 14 of wheel 10. In other examples, one or more of the plurality of rotor drive keys 12 may be mounted a different circumferential distance from an adjacent rotor drive than at least one other rotor drive key. Here and elsewhere, circumferential distance means the length of an arc (e.g., on the interior surface 14 of wheel 10 where the arc is in a plane perpendicular to the substantially axial direction of wheel 10 in this specific example). Rotor drive keys 12 may be integrally formed with tubewell 20 or may be separate from and mechanically affixed to tubewell 20.

As discussed in further detail below, one or more of the plurality of rotor drive keys 12 includes a respective support member. The support member may define an aperture extending through the support member in a substantially axial direction. The rotor drive key may be configured to receive one or more wheel bosses extending from interior surface 14 of wheel 10. One or more of the wheel bosses may also define an aperture extending through the respective wheel boss in the substantially axial direction. The aperture of the support member is configured to substantially align with the aperture of the wheel boss when the rotor drive key receives the wheel boss, allowing for a fastener to extend through the support member and the wheel boss to help secure the rotor drive key and wheel 10 relative to each other. In some examples, the support member includes a support member bearing surface and the wheel boss includes a wheel boss bearing surface, and the support member bearing surface may contact the wheel boss bearing surface when the rotor drive key and the wheel boss are connected by a fastener extending through the respective apertures. In some examples, a fastening member engaged with the fastener is configured to substantially conform to the rotor drive key and provide a degree of radial support to the rotor drive key. Here and elsewhere, "radial" connotes a direction substantially perpendicular (e.g., perpendicular or nearly perpendicular) to the axial direction of wheel 10. Similarly, "tangential" connotes a direction substantially perpendicular to the axial direction of wheel 10 and substantially perpendicular to the radial direction.

Figure 2:
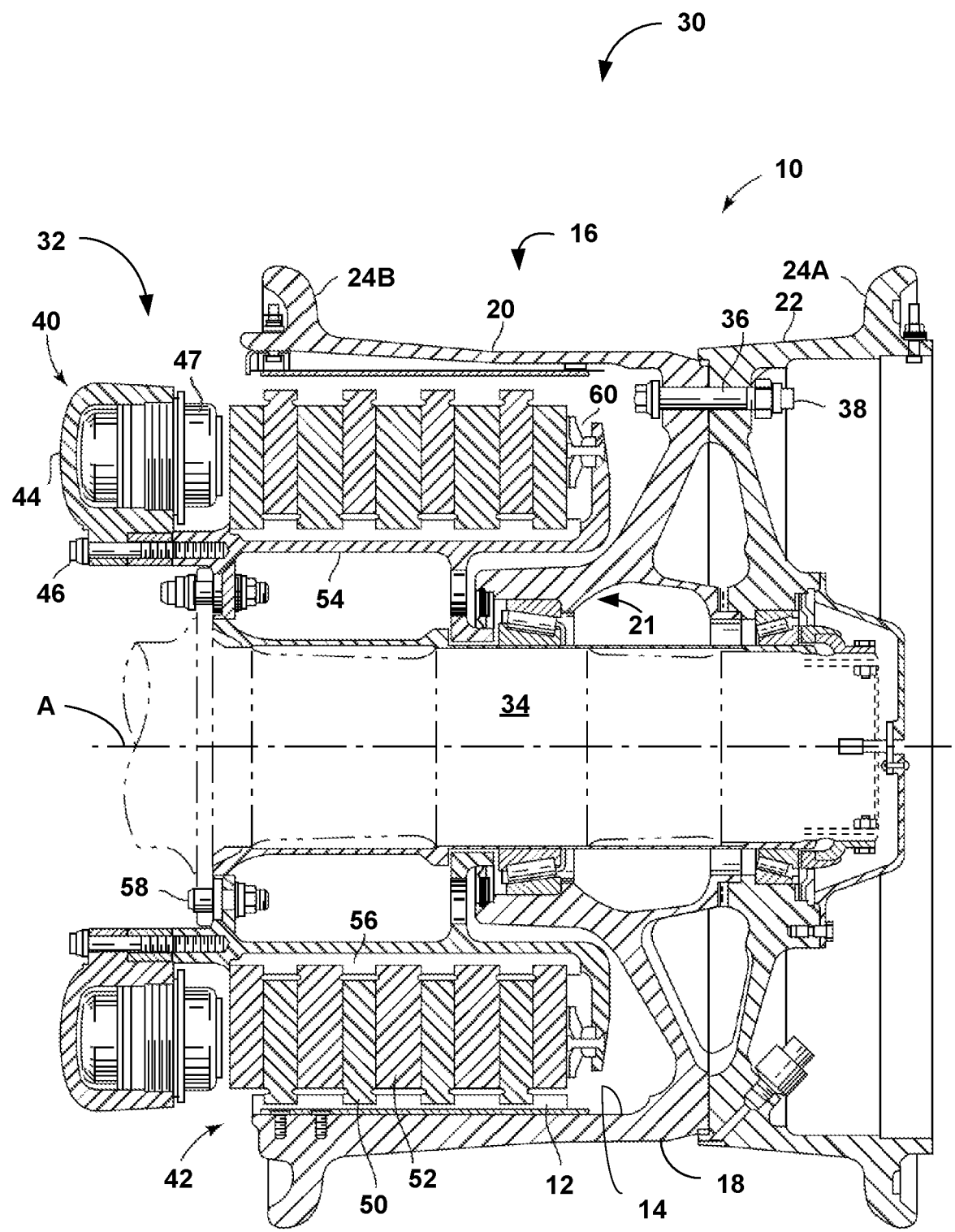
FIG. 2 is a schematic cross-sectional view illustrating an example wheel and brake assembly including the wheel of FIG. 1.

FIG. 2 is a schematic cross-sectional view illustrating an example wheel and brake assembly 30 including an example wheel 10 and a brake assembly 32. Wheel and brake assembly 30 is shown and described to provide context to the example rotor drive key and assemblies including the rotor drive keys and fasteners described herein. The rotor drive keys, fasteners, and other wheel assembly structures described herein, however, may be used with any suitable wheel and brake assembly in other examples.

Wheel 10 includes plurality of rotor drive keys 12, interior surface 14, rim 16, exterior surface 18, tubewell 20, wheel hub 21, wheel outrigger flange 22, outboard bead seat 24A, and inboard bead seat 24B. Wheel 10 may be configured to be rotatably carried on fixed axle 34. In turn, wheel 10 may impart motion to a vehicle including or mounted on the wheel and brake assembly 30. In the example shown in FIG. 2, tubewell 20 and wheel outrigger flange 22 are mechanically coupled by lug bolt 36 and lug nut 38. Other connection techniques may be used in other examples.

Brake assembly 32 includes an actuator assembly 40 and a brake stack 42. Actuator assembly 40 includes actuator housing 44, actuator housing bolt 46, and ram 47. Brake stack 42 includes interleaved rotor brake discs 50 and stator brake discs 52. Rotor brake discs 50 are configured to move relative to stator brake discs 52, e.g., rotationally about axis A and axially along axis A relative to stator brake discs 52. Rotor brake discs 50 are engaged (e.g., interface) with wheel 10, and in particular tubewell 20, by rotor drive keys 12. Stator brake discs 52 are mounted to torque tube 54 by splines 56. Wheel and brake assembly 30 may support any variety of private, commercial, or military aircraft or other type of vehicle.

Wheel and brake assembly 30 may be mounted to a vehicle via torque tube 54 and axle 34. In the example of FIG. 2, torque tube 54 is affixed to axle 34 by a plurality of bolts 58. Torque tube 54 supports actuator assembly 40 and stator brake discs 52. Axle 34 may be mounted on a strut of a landing gear (not shown) or other suitable component of the vehicle to connect wheel and brake assembly 30 to the vehicle.

During operation of the vehicle, braking may be necessary from time to time, such as during landing and taxiing procedures of an aircraft. Wheel and brake assembly 30 is configured to provide a braking function to the vehicle via actuator assembly 40 and brake stack 42. Actuator assembly 40 includes actuator housing 44 and ram 47. Actuator assembly 40 may include different types of actuators such as one or more of, e.g., an electrical-mechanical actuator, a hydraulic actuator, a pneumatic actuator, or the like. During operation, ram 47 may extend away from actuator housing 44 to axially compress brake stack 42 against compression region 60 for braking. Brake stack 42 includes interleaved rotor brake discs 50 and stator brake discs 52.

Rotor brake discs 50 are slidably engaged (e.g., slip fit) with rotor drive keys 12 for common rotation with tubewell 20 and rotor drive keys 12. Stator brake discs 52 are mounted to torque tube 54 by splines 56. In the example of FIG. 2, brake stack 42 includes four rotors and five stators. However, a different number of rotors and/or stators may be included in brake stack 42 in other examples. Rotor brake discs 50 and stator brake discs 52 may provide opposing friction surfaces for braking an aircraft. In some examples, wheel and brake assembly 30 may include a thermal barrier between rotor brake discs 50 and tubewell 20 in order to, for example, limit thermal transfer between brake stack 42 and wheel 10.

In some examples, splines 56 may be circumferentially spaced about an outer portion of torque tube 54. Stator brake discs 52 may include a plurality of radially outwardly disposed notches along an inner diameter of the brake disc configured to engage with splines 56. Similarly, rotor brake discs 50 may include a plurality of radially inwardly disposed drive slots along an outer periphery (e.g., an outer diameter in the case of a disc having a circular cross-section) of the rotor brake disc. The drive slots may be configured to engage with rotor drive keys 12. As such, rotor brake discs 50 will rotate with the motion of wheel 10 while stator brake discs 52 remain stationary, allowing the friction surfaces of an adjacent stator brake discs 52 and rotor brake discs 50 to engage with one another to deaccelerate the rotation of wheel 10.

Figure 3:
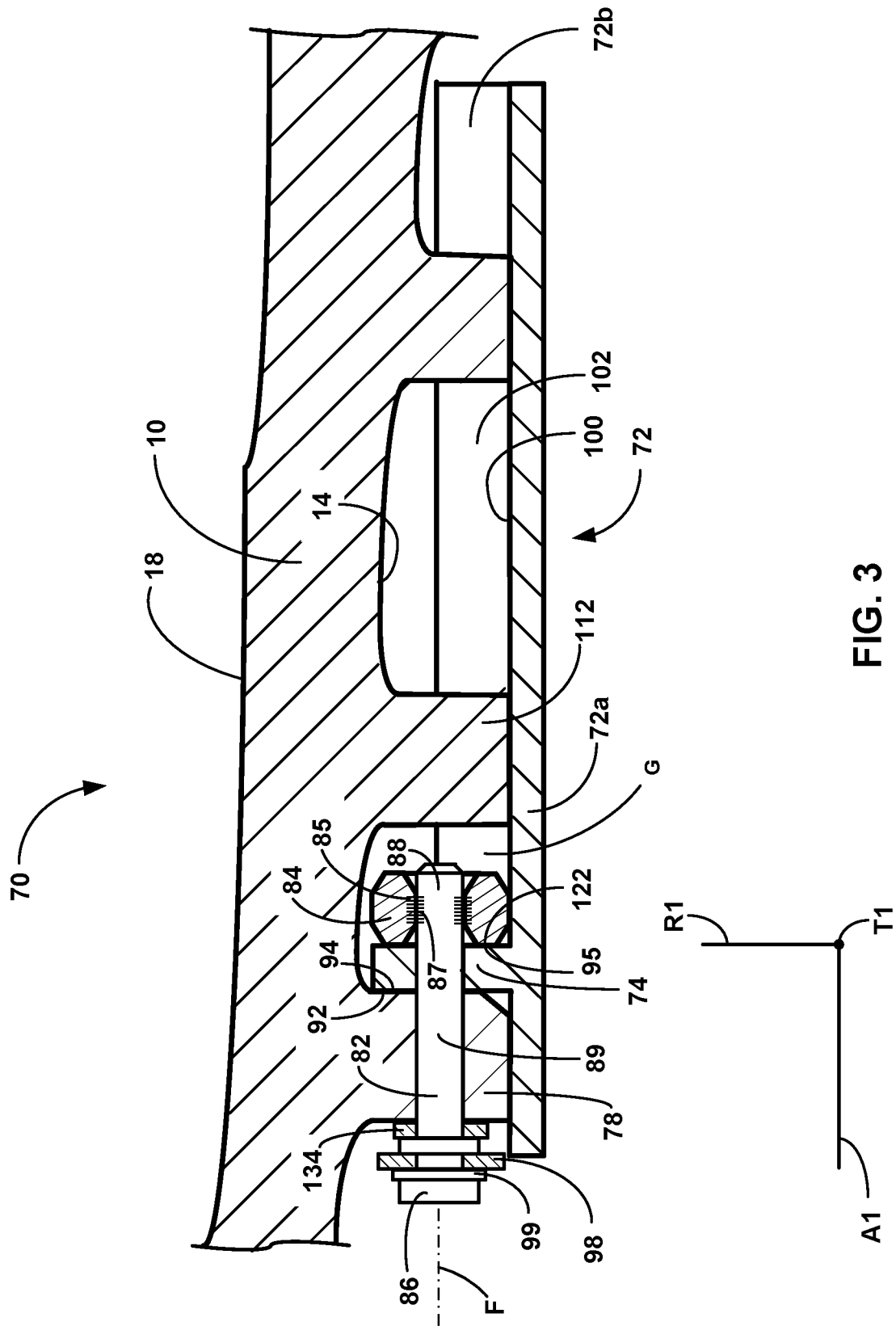
FIG. 3 is a plan view with selected cross-sections illustrating an example assembly including a rotor drive key on an interior surface of a wheel.
Figure 4:
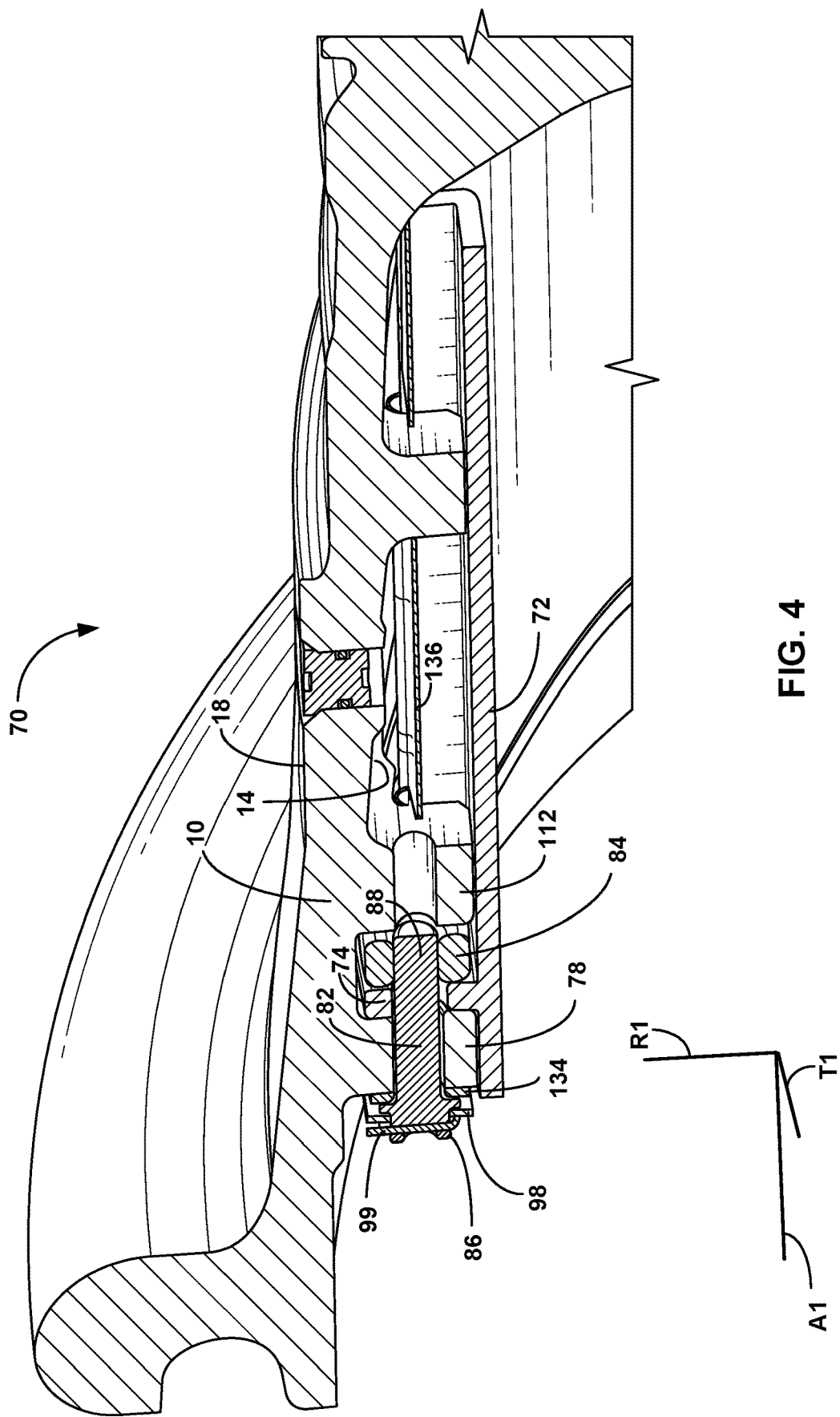
FIG. 4 is an example perspective view of the wheel and assembly of FIG. 3.

FIG. 3 illustrates an example assembly 70 and depicts a cross-section of wheel 10 defining exterior surface 18 and interior surface 14, the cross-section being taken parallel to axial direction A in FIG. 1. In FIG. 3, a line A1 is coincident with the axis of rotation A of wheel 10 (FIGS. 1 and 2) and illustrates the axial direction of wheel 10. A line R1 is perpendicular to and intersects the line A1 and indicates a radial direction of wheel 10. A line T1 is perpendicular to both line A1 and line R1 and indicates a tangential direction of wheel 10 (line T1 is perpendicular to the page in FIG. 3). FIG. 4 is an example perspective view of the wheel and assembly of FIG. 3, illustrated with respect to lines A1, R1, and T1. Wheel 10 defines a wheel boss 78 protruding from interior surface 14. Wheel boss 78 may protrude in a generally radial direction from interior surface 14. FIG. 3 further depicts an example rotor drive key 72 comprising a support member 74. Rotor drive key 72 is an example of rotor drive key 12 of FIGS. 1 and 2.

Wheel 10 may comprise any number of wheel bosses and any number of assemblies 70. Wheel bosses (including wheel boss 78) protruding from interior surface 14 may extend in a substantially radial direction (e.g., the direction R1) from adjacent portions of interior surface 14. Wheel bosses may have any suitable height in the substantially radial direction. Moreover, a plurality of wheel bosses may comprise wheel bosses having the same height or substantially the same height, or comprise wheel bosses having different heights. Similarly, a plurality of wheel bosses may comprise wheel bosses having the same width or substantially the same width, or comprise wheel bosses having different widths. In some examples, wheel bosses may be present at substantially equal circumferential distances around interior surface 14 of wheel 10. In other examples, one or more of a plurality of wheel bosses may be present at different circumferential distances from an adjacent wheel boss. Additionally, wheel bosses may be any suitable distance from each other in the axial direction of wheel 10.

In the example shown in FIG. 3, rotor drive key 72 comprises section 72a (shown in cross-section) and section 72b. Rotor drive key 72 is configured to surround at least some portion of wheel boss 78 when rotor drive key 72 is positioned over wheel boss 78. For example, section 72b may extend around wheel boss 78, as shown in FIG. 3. In examples, rotor drive key 72 includes a base section 100, a first side section 102, and second side section (not shown) substantially opposite first side section 102. Assembly 70 further comprises a fastener 82, which includes a fastener head 86 and fastening section 88. Fastener 82 may include a fastener shank 89 between fastener head 86 and fastening section 88. Fastener 82 is an elongated structure defining a fastener axis F through fastener head 86 and fastening section 88. Fastener 82 is configured to extend through wheel boss 78 and support member 74 such that at least some portion of fastening section 88 extends beyond support member 74 when rotor drive key 72 is positioned over wheel boss 78. In some examples, when fastener 82 extends through wheel boss 78 and support member 74, wheel boss 78 is between fastener head 86 and support member 74.

Assembly 70 further comprises a fastening member 84 (shown in cross-section) configured to engage with fastening section 88, e.g., in a manner that fixes a relative position of fastening member 84 and fastener 82. In some examples, when fastening member 84 is engaged with fastening section 88 and fastener 82 extends through wheel boss 78 and support member 74, support member 74 is between wheel boss 78 and fastening member 84. In an example, fastening member 84 defines a set of threads 85 ("member threads 85") configured to threadably engage with a set of threads 87 ("fastener threads 87") defined by fastener 82. Member threads 85 may be internal threads substantially surrounding an aperture (e.g., aperture 132 (FIG. 6)) defined by fastening member 84. Fastener threads 87 may be external threads defined on an exterior surface of fastening section 88.

In an example, when fastening member 84 is engaged with fastening section 88, an axial movement of fastening member 84 (e.g., in a direction substantially parallel to fastener axis F and/or in the axial direction A of wheel 10 (FIG. 1) causes a corresponding axial movement of fastener 82. In examples, when fastening member 84 is engaged with fastening section 88 and fastening member 84 is constrained from the axial movement, fastener 82 is also constrained from the axial movement.

In some examples, support member 74 of rotor drive key 72 defines a support bearing surface 94 configured to engage with (e.g., directly contact) wheel boss 78 when rotor drive key 72 is positioned over wheel boss 78. In examples, support bearing surface 94 is configured to substantially extend in the tangential direction T1 and the radial direction R1 of wheel 10 when rotor drive key 72 is positioned over wheel boss 78. In some examples, support bearing surface 94 is a planar surface. In other examples, support bearing surface 94 may define another surface configured to engage with wheel boss 78. In some examples, rotor drive key 72 is positioned over wheel boss 78 and fastener 82 extends through wheel boss 78 and support member 74, at least some portion of support bearing surface 94 is in contact with wheel boss 78.

In some examples, support member 74 defines a second bearing surface 95 (FIGS. 3 and 8A-8C) opposite support bearing surface 94. In some examples, when fastening member 84 is engaged with fastening section 88, at least some portion of second support bearing surface 95 contacts member bearing surface 122. For example, FIG. 3 illustrates member bearing surface 122 in contact with second support bearing surface 95. Second support bearing surface 95 may be a planar surface. In examples, member bearing surface 122 comprises a first planar surface and second support bearing surface 95 comprises a second planar surface, and when fastening member 84 is engaged with fastener 82, the first planar surface is in contact with and substantially parallel to the second planar surface.

In some examples, wheel boss 78 defines a boss bearing surface 92 configured to engage with support bearing surface 94 when rotor drive key 72 is positioned over wheel boss 78. FIG. 7 illustrates an isometric view of an example wheel boss 78 defining boss bearing surface 92 (shown as a hidden surface). In some examples, aperture 80 of wheel boss 78 defines an opening in boss bearing surface 92. In addition, in some examples, when fastener 82 extends through wheel boss 78 and support member 74, at least some portion of support bearing surface 94 is in contact with boss bearing surface 92. For example, FIG. 3 illustrates support bearing surface 94 in contact with boss bearing surface 92. Boss bearing surface 92 may be a planar surface. In examples, support bearing surface 94 comprises a first planar surface and boss bearing surface 92 comprises a second planar surface, when fastener 82 extends through wheel boss 78 and support member 74, the first planar surface is in contact with and substantially parallel to the second planar surface. In other examples, boss bearing surface 92 and support bearing surface 94 may define complementary surfaces other than planar surface, such as complementary curvilinear surfaces.

In some examples, support member 74 defines an aperture 76 extending through support member 74. FIG. 5 illustrates aperture 76 extending through support member 74, with the hidden portions of aperture 76 shown in dashed lines for clarity. In some examples, wheel boss 78 defines an aperture 80 extending through wheel boss 78. FIG. 7 illustrates aperture 80 extending through wheel boss 78, with the hidden portions of aperture 80 shown in dashed lines for clarity. Fastener 82 (FIG. 2) is configured to extend through aperture 80 of wheel boss 78 and aperture 76 of support member 74 when rotor drive key 72 is positioned over wheel boss 78. In some examples, aperture 76 is configured such that when fastener 82 extends through aperture 76 and aperture 80, aperture 76 is substantially aligned with aperture 80. In some examples, aperture 76 of support member 74 has a central axis B extending through a center of aperture 76, and aperture 80 of wheel boss 78 has a central axis C extending through a center aperture 80, and when fastener 82 extends through aperture 76 and aperture 80, axis B and axis C are substantially parallel (e.g., parallel or nearly parallel to the extent permitted by manufacturing tolerances) to the axial direction A of wheel 10 (FIG. 1).

Figure 8C:
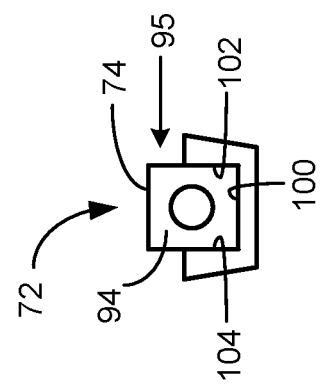
FIG. 8C is a side view of the example rotor drive key of FIG. 3.
Figure 8A:
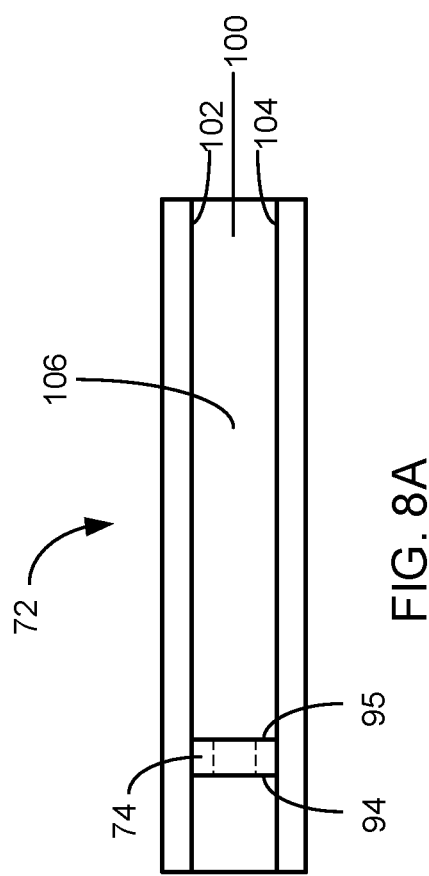
FIG. 8A is a top view of the example rotor drive key of FIG. 3.
Figure 8B:
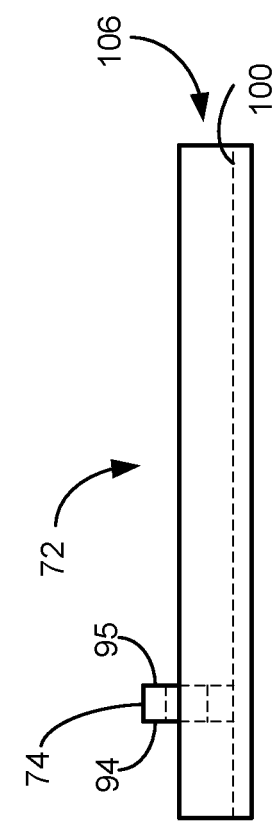
FIG. 8B is a front view of the example rotor drive key of FIG. 3.

In some examples, rotor drive key 72 defines a trough forming an open, channel-like passage. An example of such a rotor drive key is shown in FIGS. 5 and 8A-8C, which illustrate different plan views of rotor drive key 72. FIG. 8A illustrates a top view of rotor drive key 72, FIG. 8B illustrates a side view of rotor drive key 72, and FIG. 8C illustrates a front view of rotor drive key 72. The example rotor drive key 72 shown in FIGS. 8A-8C comprises base section 100, first side section 102, and second side section 104. First side section 102 and second side section 104 extend from base section 100, with second side section 104 substantially opposite first side section 102. For example, first side section 102 and second side section 104 may be physically separate from base section 100 and mechanically attached to base section 100, or may be integrally formed with base section 100.

First side section 102, second side section 104, and base section 100 extend at least part of the length of rotor drive key 72 and define at least some portion of trough 106. In some examples, such as depicted at FIGS. 8A-8C, support member 74 is positioned within trough 106.

Trough 106 may be configured to complement a portion of the wheel boss, or vice versa, to provide radial and/or tangential stability to the rotor drive key during rotation or braking of the wheel. Trough 106 is configured to receive some part of wheel boss 78 when rotor drive key 72 is installed over wheel boss 78, such that first side section 102, second side section 104, and base section 100 at least partially surround some part of wheel boss 78. In some examples, as shown in FIG. 7, wheel boss 78 may comprise a first side 108 and second side 110, where second side 110 is opposite first side 108 (in FIG. 7, second side 110 is illustrated as a hidden surface), and trough 106 may surround at least some part of first side 108 and some part of second side 110 when rotor drive key 72 is positioned over wheel boss 78. In some examples, surfaces of rotor drive key 72 defining trough 106 contacts at least a portion of first side 108 and second side 110. In some examples, trough 106 and/or wheel boss 78 is configured to provide an engineering fit between trough 106 and wheel boss 78. The engineering fit may be a fit such as a sliding fit, a locational fit, a transitional fit, or an interference fit. Such a fit may provide increased tangential and radial stability of rotor drive key 72 during rotation and braking of wheel 10, among other advantages.

In some examples, trough 106 is configured to surround some portion of fastening member 84 when rotor drive key 72 is installed on wheel boss 78. Fastening member 84 can be configured to engage with rotor drive key 72 to help hold fastening member 84 in place relative to rotor drive key 72 and wheel boss 78. For example, in some examples, fastening member 84 comprises an arm which is configured to extend outside trough 106 when fastening member 84 engages (e.g., threadably engages) fastening section 88 (FIG. 1). In examples, the arm may extend between trough 106 and interior surface 14 of wheel 10.

FIG. 6 illustrates an example fastening member 84 defining member threads 85, a first arm 114 extending from a fastening member body 120, and a second arm 116 extending from fastening member body 120 in a substantially opposite direction from first arm 114. Fastening member 84 may be referred to as a "T-nut" in some examples due to the manner in which arms 114, 116 extend from fastening member body 120 to define a T-shape. In some examples, first arm 114 and/or second arm 116 are configured (e.g., with a geometry and sizes) to extend outside trough 106 when fastening member 84 engages fastening section 88 of fastener 82 and fastener 82 is extending through support member 74. In some examples, first arm 114 and/or second arm 116 may extend between trough 106 and interior surface 14 of wheel 10. Such an arrangement may provide radial support to rotor key drive 72 when rotor drive key 72 is installed over wheel boss 78. In some examples, first arm 114 may comprise a first support surface 128 and second arm 116 may comprise second support surface 130. First support surface 128 and second support surface 130 may be configured to contact rotor drive key 72, e.g., portions of first and second sections 102, 104 defining trough 106, when fastener 82 extends through apertures 76, 80 in rotor drive key 72 and wheel boss 78, respectively, and when fastening member 84 engages fastening section 88. In examples, first arm 114 and/or second arm 116 are configured to provide axial support to a heat shield 136 (FIG. 9, 10) within the wheel.

As shown in FIG. 6, fastening member 84 may comprise a first side 124 and a second side 126 opposite the first side 124, and trough 106 may surround at least some part of first side 124 and some part of second side 126. In some examples, surfaces of rotor drive key 72 defining trough 106 may contact at least a portion of first side 124 and second side 126 when fastening member 84 engages fastening section 88. In some examples, trough 106 and/or fastening member 84 is configured to provide an engineering fit between trough 106 and fastening member 84. The engineering fit may be a fit such as a sliding fit, a locational fit, a transitional fit, or an interference fit. Such a fit may provide increased tangential and radial stability of rotor drive key 72 and/or fastening member 84 during rotation and braking of wheel 10, among other advantages.

In examples, fastening member 84 may comprise a member bearing surface 122 (FIG. 6). Member bearing surface 122 may be a planar surface in some examples or curvilinear in other examples. Member bearing surface 122 may be configured to establish contact with support member 74. In examples, when fastening member 84 is engaged with fastening section 88, at least some portion of fastening member 84 is in contact with support member 74.

Figure 9:
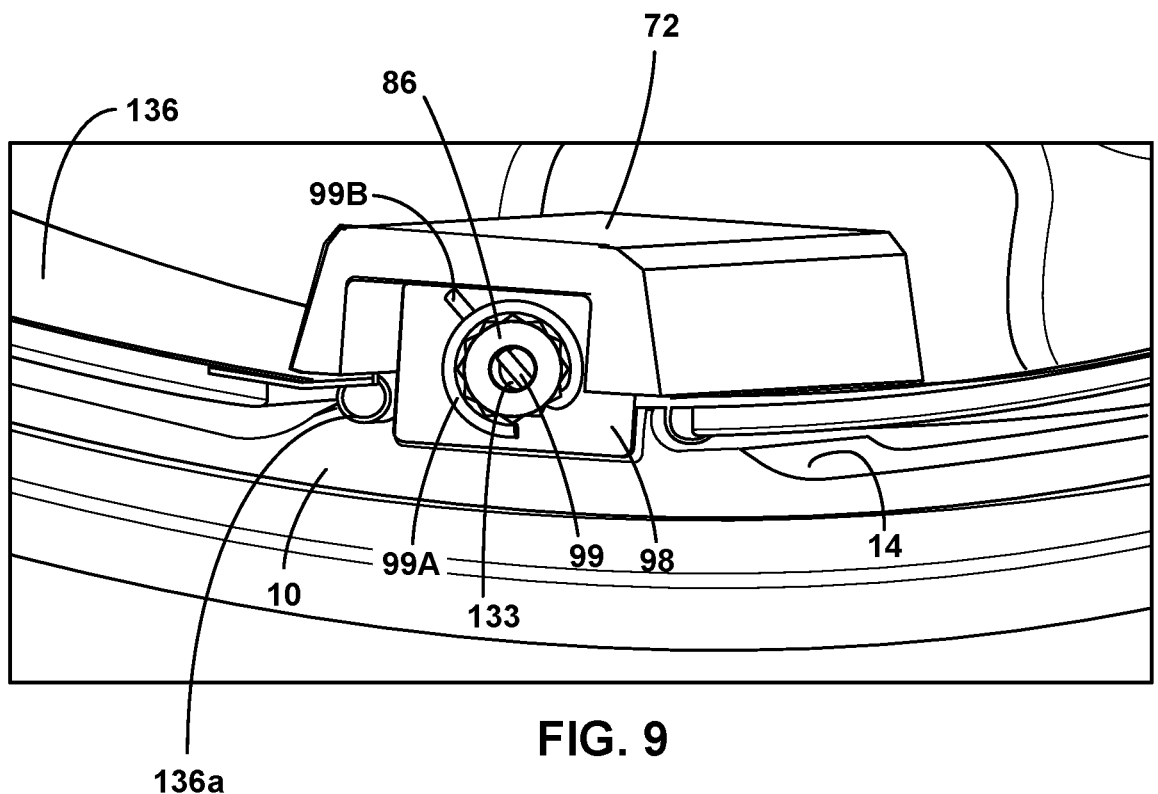
FIG. 9 is a perspective view illustrating an example assembly attached to the interior surface of the wheel via the fastener and a fastener locking mechanism.
Figure 10:
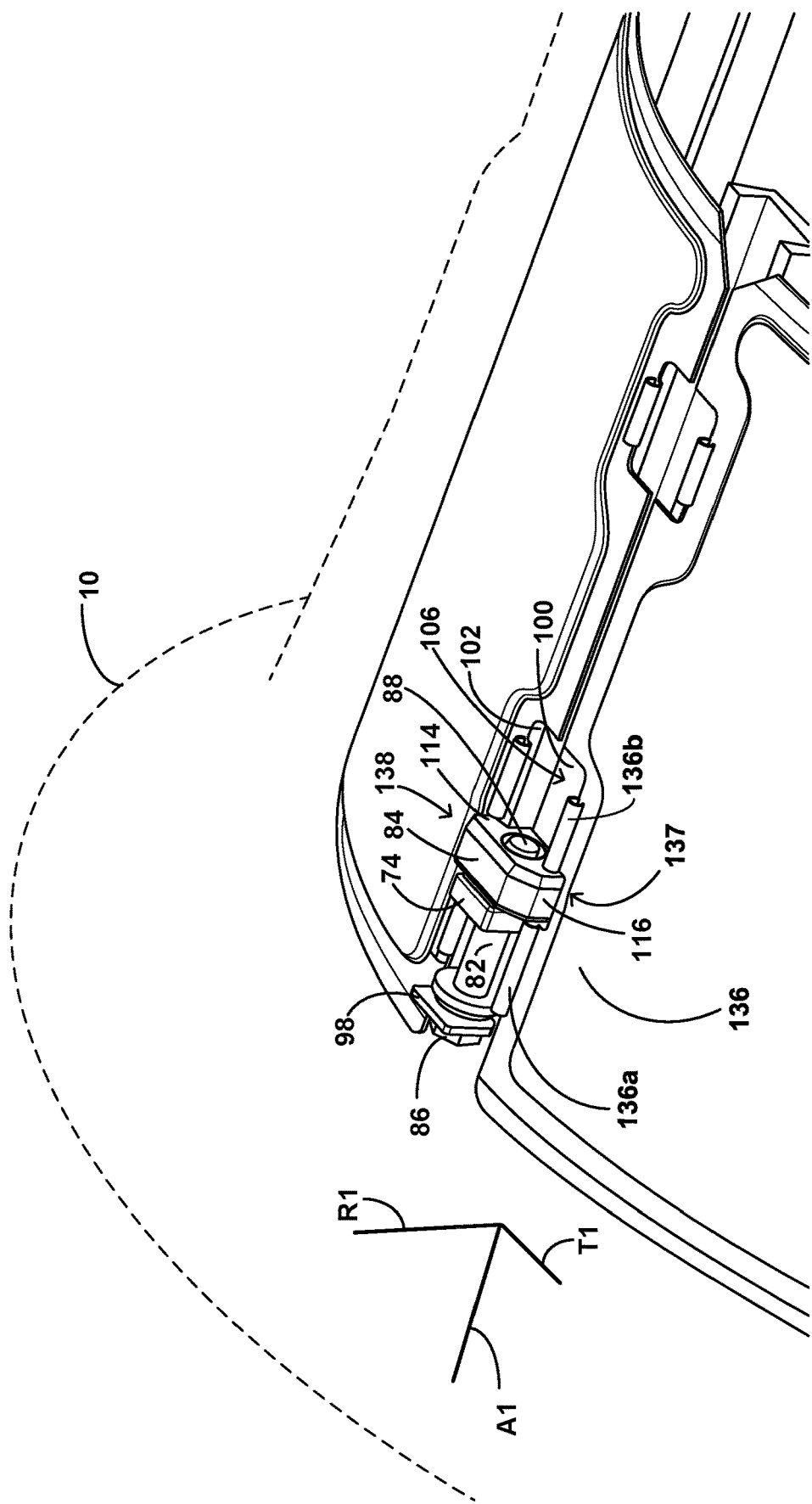
FIG. 10 is an example perspective view of the assembly of FIG. 3.

In examples, first arm 114 and/or second arm 116 may be configured to axially support a heat shield 136 (FIG. 9, 10) within wheel 10. Heat shield 136 may line some portion of the interior surface 14 of wheel 10. For example, FIG. 9 illustrates heat shield 136 substantially conforming to an interior surface 14 of wheel 10. In examples, at least some portion of heat shield 136 may substantially "float" on interior surface 14 (e.g., not be fixably attached to interior surface 14). Heat shield 136 may reside partially between rotor drive key 72 and interior surface 14 of wheel 10. For example at FIG. 9, section 136a of heat shield 136 resides between rotor drive key 72 and interior surface 14 of wheel 10. FIG. 10 illustrates heat shield 136 and section 136a viewed from a position exterior to wheel 10, with wheel 10 surrounding heat shield 136 and illustrated in dashed lines for clarity. In the example shown in FIG. 10, heat shield 136 substantially surrounds axis A of wheel 10 (FIG. 1). FIG. 10 also illustrates fastener head 86 and fastening section 88 of fastener 82, an example locking plate 98, and rotor drive key 72 including support member 74, base section 100, first side section 102, and trough 106.

In FIG. 10, fastening member 84 is illustrated with first arm 114 and second arm 116 extending from trough 106. First arm 114 and/or second arm 116 of fastening member 84 are configured to extend from trough 106 and provide axial support to heat shield 136, to mitigate or even prevent movement of shield 136 in the axial direction A1 of wheel 10. For example, as illustrated in FIG. 10, second arm 116 is configured to encounter a portion of heat shield 136 (e.g., portion 136a and/or portion 136b) when heat shield 136 moves or attempts to move in the axial direction A1, such that second arm 116 blocks or mitigates the axial movement. Second arm 116 may be configured to contact some portion of heatshield 136 (e.g., portion 136a and/or 136b) when second arm 116 extends from trough 106. In some examples, heat shield 136 comprises a notch such as notch 137 (FIG. 10), and one of first arm 114 or second arm 116 is configured to reside within notch 137. In examples, first arm 114 is configured to reside within a notch 138 of heat shield 136 and second arm 116 is configured to reside within a notch 137 of heat shield 136.

In some examples, a wheel boss (e.g., wheel boss 78 and/or wheel boss 112) of wheel 10 is configured to provide tangential support to heat shield 136, to mitigate or even prevent movement of shield 136 in the tangential direction T1 of wheel 10. For example, a first side (e.g., first side 108 (FIG. 7) and/or a second side (e.g., second side 110 (FIG. 7)) of a wheel boss may be configured to encounter a portion of heat shield 136 (e.g., portion 136a and/or portion 136b) when heat shield 136 moves or attempts to move in the tangential direction T1, such that the first side and/or the second side of the wheel boss blocks or mitigates the tangential movement. In some examples, portions 136a, 136b of heat shield 136 are configured to encounter second arm 116 when heat shield 136 moves or attempts to move in the axial direction A1 of wheel 10, and configured to encounter a wheel boss (e.g., wheel boss 78, 112) when heat shield 136 moves or attempts to move in the tangential direction T1 of wheel 10, Fastening member 84 is configured to mechanically attach to fastener 82. For example, fastening member 84 may comprise internal threads such as member threads 85. In some examples, fastening member 84 may comprise an aperture 132 (FIG. 6) and the aperture 132 may comprise internal threads. In some examples, fastening member 84 may comprise a fastening member boss extending from fastening member body 120, with the fastening member boss comprising internal threads. In some examples, a fastening member boss extending from fastening member body 120 may have external threads.

In some examples, rotor drive key 72 is configured such that when fastener 82 extends through wheel boss 78 and support member 74, there is a clearance between rotor drive key 72 and interior surface 14 of wheel 10 in a substantially radial direction of the wheel. In some examples, fastening member 84 is configured to have a size or shape providing one or more dimensions which prevent passage of fastening member 84 through the clearance. For example, fastening member 84 may have a width dimension in the axial direction of the wheel which prevents passage of fastening member 84 through the clearance. The radial clearance and fastening member 84 dimension may provide containment of fastening member 84 should fastening member 84 detach from fastener 82 during operation, thereby helping to prevent fastening member 84 from interfering with the operation of other parts of wheel and brake assembly 30.

As shown in FIG. 3, in some examples, fastening member 84 may be configured to provide a gap G between fastening member 84 and an additional wheel boss 112 adjacent to wheel boss 78 on interior surface 14 of wheel 10 when fastener 82 fully extends through wheel boss 78 and support member 74 (and cannot extend any further towards the adjacent wheel boss 112). Gap G may provide a clearance to enable easier handling of fastening member 84 during initial assembly of assembly 70, subsequent manipulation during tightening of fastener 82, or some other reason.

In some examples, trough 106 is configured to surround at least some part of fastener 82 (FIG. 1). In examples in which wheel 10 comprises a second wheel boss 112 (FIG. 3), and trough 106 is configured to surround at least some part of second wheel boss 112. In some examples, trough 106 contacts at least a portion of second wheel boss 112. In some examples, trough 106 and/or second wheel boss 112 is configured to provide an engineering fit between trough 106 and second wheel boss 112. The engineering fit may be a fit such as a sliding fit, a locational fit, a transitional fit, or an interference fit. Such a fit may provide increased tangential stability and radial of rotor drive key 72 during rotation and braking of wheel 10, among other advantages.

In some examples, a first bearing surface within assembly 70 (FIG. 3) and a second bearing surface within assembly 70 are complementary surfaces. For example, one of the first bearing surface and the second bearing surface might be a convex surface, with the other being a concave surface configured to receive and at least partially mate with the convex surface. In some examples, one of the first bearing surface or the second bearing surface defines a protrusion, and the other of the first bearing surface or the second bearing surface defines a recess configured to receive and at least partially mate with the protrusion. In some examples, the protrusion is a convex surface and the recess is a convex surface. In some examples, the first bearing surface is configured to form a mating connection with the second bearing surface. In some examples, the first bearing surface and the second bearing surface are frictionally engaged. In some examples, boss bearing surface 92 is the first bearing surface and support bearing surface 94 is the second bearing surface. In some examples, fastening member bearing surface 122 is the first surface and second support bearing surface 95 is the second surface. Complementary first and second bearing surfaces may assist in maintaining the radial or axial position of rotor drive key 72 on wheel 10, may improve the robustness of the attachment of rotor drive key 72 to wheel 10, may reduce motion of rotor drive key 72 relative to wheel 10 during dynamic braking conditions and/or brake vibration events, or the like.

In some examples, assembly 70 may further include a locking mechanism configured to rotationally lock fastener 82 in place relative to wheel 10 and/or rotor drive key 72. In some such examples, the locking mechanism may include one or more of a locking plate, a retainer clip, a lock washer, a Nord-lock washer, a nylon insert, a retainer pin, a castle locking device, an adhesive, a safety wire, a safety cable, a retainer clip, or the like. FIG. 9 depicts an example locking mechanism including a locking plate 98 and a retainer clip 99. FIG. 9 also depicts rotor drive key 72 configured to fit around a wheel boss (not shown in FIG. 9) protruding from interior surface 14 of wheel 10. FIG. 9 also depicts a heat shield 136 which may be deployed on the interior surface 14 of wheel 10.

Locking plate 98 is configured to be positioned over fastener head 86 and optionally deformed over fastener head 86, to form a relatively tight interference fit with fastener head 86. In some examples, the relatively tight interference fit between locking plate 98 and fastener head 86 may help prevent fastener 82 from loosening. Fastener head 86 may define one or more access channels to allow threading (e.g., feeding) retainer clip 99 through fastener head 86. For example, in the example shown in FIG. 9, retainer clip 99 is threaded through two access channels defined by fastener head 86 such that a portion 99B of retainer clip 99 extends through a first access channel while a portion 99A of retainer clip 99 extends from a second access channel and is wrapped some portion of the perimeter of fastener head 86.

Fastener head 86 may comprise an open volume such as open cylindrical volume 133 to provide visual or other access to retainer clip 99, and/or too allow tightening of fastener 82, or for some other reason. In some examples, fastener head 86 has a serrated surface at least partially surrounding its outer diameter, in order to enable retainer clip 99 to more effectively grip fastener head 86, and/or to allow tightening of fastener 82, or for some other reason. Locking plate 98 and retainer clip 99 are additionally depicted at FIG. 3. Assembly 70 (FIG. 3) may additionally comprise gaskets, washers, and the like such as component 134 between fastener head 86 and wheel boss 78.

In some examples, when fastener 82 extends through wheel boss 78 and support member 74 and is engaged with fastening member 84, rotor drive key 72 is anchored by the action of one or more of fastener 82, fastening member 84, wheel boss 78, and support member 74 and cantilevered in a substantially axial direction A of wheel 10. This may enable one or more bolts or other fasteners oriented along a radial wheel axis or perpendicular to a length of a rotor drive key to be eliminated from the assembly. Fasteners oriented along a radial wheel axis or otherwise perpendicular to a length of a rotor drive key may be more difficult to install than the substantially axially extending bolts described herein, e.g., may require a special right angle tool to install the bolt. Further, bolts oriented along a radial wheel axis or otherwise perpendicular to a length of a rotor drive key may be more likely to become unattached to interior surface 14 of wheel 10 compared to the axially oriented fastener 82 described herein. For instance, heat cycling, vibration, or the like may result in the bolt becoming loose or even completely unattached to the rotor drive key and the wheel assembly. In addition, there may not be sufficient radial clearance in the wheel assembly for a nut or other retaining mechanism to be used with a bolt that extends in the radial direction. Loosening of the bolt may cause the rotor drive key to be unsecured to wheel 10, which may decrease the useful life of the rotor drive key and/or wheel, and interrupt the function of the braking assembly for the wheel, increase maintenance costs, result in premature replacement of the rotor drive key, or the like.

In addition, some other rotor drive keys may not include a support member acting against a wheel boss. Thus, in some such examples, the rotor drive keys may be subject to increased movement (e.g., axial or radial), as the assembly does not include features configured to engage in the substantially axial direction. Moreover, in examples in which the bolt loosens or disengages, the rotor drive keys of such assemblies may not include any other mechanism or point of engagement configured to help maintain the rotor drive key in an intended position on the interior surface of the wheel.

Rotor drive key 72, fastening member 84, and fastener 82, as well as other components described herein, may be made from any suitable material. For example, the material may be any material of suitable strength for the intended use of rotor drive key 72, fastening member 84, or fastener 82. In some examples, the material includes a metal or a metal alloy. For example, the material may include a nickel alloy or steel alloy. As one example, the material may include stainless steel.

In some examples, rotor drive key 72 may be forged, casted, made from bar stock, additive manufactured (e.g., three-dimensionally (3D) printed), or be produced using other suitable methods. In some examples, rotor drive key 72 may be machined to obtain a rotor drive key 72 defining one or more of support member 74, aperture 76, trough 106, base section 100, first side section 102, and second side section 104. In other examples, rotor drive key 72 may be forged, cast, or otherwise formed (e.g., without having to be substantially machined) and/or additive manufactured to define one or more of support member 74, aperture 76, trough 106, base section 100, first side section 102, and second side section 104.

In some examples, fastening member 84 may be forged, casted, made from bar stock, additive manufactured (e.g., three-dimensionally (3D) printed), or be produced using other suitable methods. In some examples, fastening member 84 may be machined to obtain a fastening member 84 defining one or more of fastening member body 120, first arm 114, second arm 116, member threads 85, member bearing surface 122, first side 124, second side 126, first support surface 128, and second support surface 130. In other examples, fastening member 84 may be forged, cast, or otherwise formed (e.g., without having to be substantially machined) and/or additive manufactured to define one or more of fastening member body 120, first arm 114, second arm 116, member threads 85, member bearing surface 122, first side 124, second side 126, first support surface 128, and second support surface 130.

In some examples, fastener 82 may be forged, casted, made from bar stock, additive manufactured (e.g., three-dimensionally (3D) printed), or be produced using other suitable methods. In some examples, fastener 82 may be machined to obtain a fastener 82 defining one or more of fastener head 86, fastener shank 89, fastener threads 87, and fastening section 88. In other examples, fastener 82 may be forged, cast, or otherwise formed (e.g., without having to be substantially machined) and/or additive manufactured to define one or more of fastener head 86, fastener shank 89, and fastening section 88.

In some examples, wheel 10 may be finish machined from a near-net-shaped aluminum forging and contain wheel bosses for assembly of rotor drive key 72 onto wheel 10 using fastener 82 extending through for example wheel boss 78 and support member 74. In other examples, wheel 10 may be manufactured in a different manner. In yet other examples, wheel 10 may be obtained rather than manufactured. In some examples, wheel 10 may be obtained and machined to form interior surface 14 including a plurality of wheel bosses. Wheel 10 may be made of any suitable material. In some examples, wheel 10 includes a metal or a metal alloy. For example, wheel 10 may include aluminum, a nickel alloy, a steel alloy (e.g., stainless steel), titanium, a carbon-composite material, or magnesium.

Figure 11:
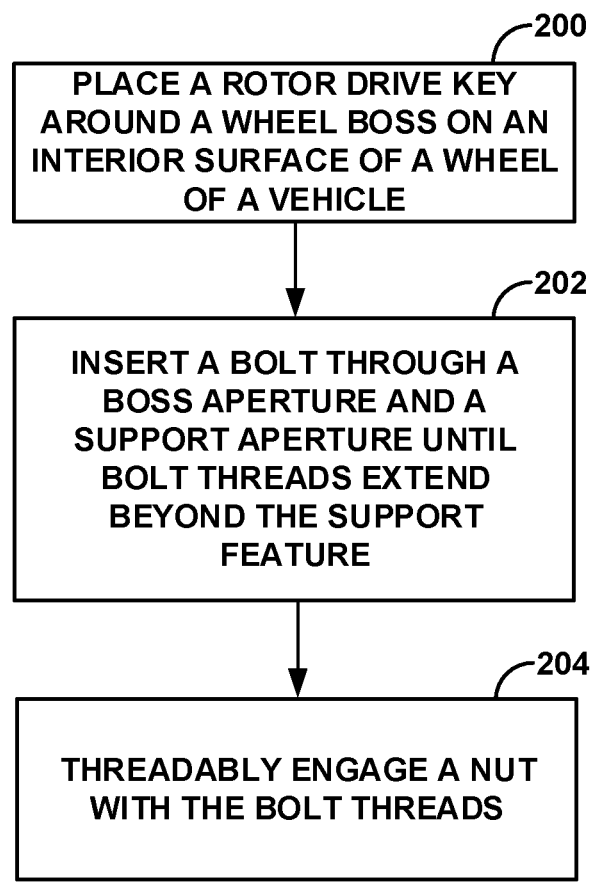
FIG. 11 is a flow diagram illustrating an example method of attaching a rotor drive key to an interior surface of a wheel.

FIG. 11 is a flow diagram illustrating an example method of attaching a rotor drive key to an interior surface of a wheel. The example method of FIG. 11 includes placing rotor drive key 72 having support member 74 around some portion of wheel boss 78 on interior surface 14 of wheel 10 (200). Placing the rotor drive key 72 may include inserting fastening member 84 into trough 106 of rotor drive key 72. In some examples, placing the rotor drive key 72 may include aligning aperture 76 extending through support member 74 with aperture 80 extending through wheel boss 78. In some examples, placing the rotor drive key 72 may include contacting trough 106 of rotor drive key 72 with first side 108 and second side 110 of wheel boss 78 (e.g., establishing a contact fit between trough 106 and first side 108 and second side 110 of wheel boss 78). In some examples, placing rotor drive key 72 may include contacting support bearing surface 94 and boss bearing surface 92.

The example method further includes extending fastener 82 through aperture 80 of wheel boss 78 and aperture 76 of support member 74 (202). In some examples, extending fastener 82 may include extending fastener 82 in the substantially axial direction of wheel 10.

The example method further includes engaging fastening member 84 with the fastening section 88 of fastener 82 (204). In some examples, engaging fastening member 84 with fastening section 88 includes threadably engaging fastener threads 87 and member threads 85. In some examples, engaging fastening member 84 includes contacting first side 124 and second side 126 of fastening member body 120 with trough 106 of rotor drive key 72. In some examples, engaging fastening member 84 may include extending a first arm 114 and/or second arm 116 of fastening member 84 outside trough 106 of rotor drive key 72. In some examples, engaging fastening member 84 may include contacting first support surface 128 and/or second support surface 130 of fastening member 84 with trough 106 of rotor drive key 72. In some examples, engaging fastening member 84 may include contacting member bearing surface 122 and second support bearing surface 95.

In some examples, the method may include placing a washer and/or gasket around a shank of fastener 82. For example, the washer and/or gasket may be placed between fastener head 86 and wheel boss 78. In some examples, the method may include placing a locking plate 98 around fastener head 86 of fastener 82.

In some examples, the method may include tightening fastener 82 and fastening member 84. In some examples, the tightening fastener 82 and fastening member 84 may include establishing frictional contact between boss bearing surface 92 of wheel boss 78 and support bearing surface 94 of support member 74. In some examples, tightening fastener 82 and fastening member 84 may include establishing frictional contact between second support bearing surface 95 and member bearing surface 122.

In some examples, tightening fastener 82 and fastening member 84 may include anchoring rotor drive key 72 with one or more of fastener 82, fastening member 84, wheel boss 78, and support member 74 and cantilevering rotor drive key in a substantially axial direction of the wheel.

In some examples, tightening fastener 82 and fastening member 84 may include inserting retainer clip 99 through fastener head 86. In some examples, tightening fastener 82 and fastening member 84 may include wrapping retainer clip 99 around some portion of a circumference of fastener head 86. In some examples, tightening fastener 82 and fastening member 84 may include wrapping retainer clip 99 around a serrated edge extending around some part of the circumference of fastener head 86.

The present disclosure includes the following examples.

Example 1: An assembly comprising: a rotor drive key configured to be positioned over a wheel boss of a wheel, wherein the rotor drive key defines a support member; a fastener configured to extend through the wheel boss and the support member in a substantially axial direction of the wheel when the rotor drive key is positioned over the wheel boss, wherein a fastening section of the fastener extends beyond the support member when the fastener extends through the wheel boss and the support member; and a fastening member configured to engage with the fastening section.

Example 2: The assembly of example 1, wherein the fastening member is configured to threadably engage with the fastening section.

Example 3: The assembly of any combination of examples 1-2, wherein the rotor drive key defines a trough configured to surround at least some part of the fastening member when the fastener extends through the support member and the fastening member engages the fastening section.

Example 4: The assembly of example 3, wherein the fastening member comprises an arm configured to extend outside of the trough when the fastener extends through the support member and the fastening member engages the fastening section.

Example 5: The assembly of example 4, wherein the arm is a first arm and the fastening member comprises a second arm extending in a substantially opposite direction from the first arm, wherein the second arm is configured to extend outside of the trough when the fastener extends through the support member and the fastening member engages the fastening section.

Example 6: The assembly of any combination of examples 1-5, wherein the rotor drive key is configured to cantilever from one or more of the fastener, the fastening member, the wheel boss, or the support member in the substantially axial direction of the wheel when the rotor drive key is positioned over the wheel boss and the fastener extends through the wheel boss and the support member.

Example 7: The assembly of any combination of examples 1-6, wherein the fastening member comprises a first side and a second side opposite the first side, and wherein the rotor drive key is configured to contact the first side and the second side when the fastener extends through the support member and the fastening member engages the fastening section.

Example 8: The assembly of any combination of examples 1-7, wherein the fastening member comprises a member bearing surface and the support member comprises a support bearing surface, and wherein the member bearing surface is configured to contact the support bearing surface when the fastener extends through the support member and the fastening member engages the fastening section.

Example 9: The assembly of any combination of examples 1-8, further comprising the wheel defining an interior surface and comprising the wheel boss along the interior surface, wherein: the wheel boss defines a boss aperture, and the support member defines a support member aperture, wherein, when the rotor drive key is positioned over the wheel boss, the fastener is configured to extend through the boss aperture and the support member aperture, and wherein the support member aperture is configured to be aligned with the boss aperture when the fastener extends through the boss aperture and the support member aperture.

Example 10: The assembly of any combination of examples 1-9, further comprising the wheel defining an interior surface and comprising the wheel boss along the interior surface, wherein the wheel boss comprises a pair of opposite sides, and wherein the rotor drive key defines a trough configured to surround at least some portion of each of the opposite sides when the rotor drive key is positioned over the wheel boss.

Example 11: The assembly of any combination of examples 1-10, further comprising a locking mechanism configured to rotationally lock the fastener relative to the rotor drive key when the fastener extends through the support member and the fastening member engages the fastening section.

Example 12: An assembly comprising: a vehicle wheel comprising a wheel boss defining a boss aperture; a rotor drive key configured to position over the wheel boss, wherein the rotor drive key comprises a support member defining a support member aperture configured to align with the boss aperture in a substantially axial direction of the wheel; a fastener comprising a fastener head at a first end and fastening section at a second end, the fastener configured to extend through the boss aperture and the support member aperture such that the wheel boss is in between fastener head and the support member, and such the fastening section extends beyond the support member aperture; and a fastening member configured to engage with the fastening section to secure the fastener in place relative to the rotor drive key.

Example 13: The assembly of example 12, wherein the rotor drive key is cantilevered from one or more of the fastener, the fastening member, the wheel boss, or the support member in a substantially axial direction of the vehicle wheel.

Example 14: The assembly of any combination of examples 12-13, wherein the rotor drive key defines a trough configured to surround at least some part of the fastening member when the rotor drive key is positioned over the wheel boss and the fastener extends through the support member aperture and the boss aperture.

Example 15: The assembly of example 14, wherein the fastening member comprises an arm configured to extend outside of the trough when the rotor drive key is positioned over the wheel boss, the fastener extends through the support member aperture and the boss aperture, and the fastening member is engaged with the fastening section.

Example 16: The assembly of claim 15 further comprising a heat shield conforming to an interior surface of the wheel, wherein the arm is configured to substantially limit movement of the heat shield in a substantially axial direction of the wheel.

Example 17: The assembly of any combination of examples 12-16, wherein the fastening member is configured to threadably engage with the fastening section.

Example 18: The assembly of any combination of examples 12-17, further comprising a locking mechanism configured to rotationally lock the fastener relative to the rotor drive key when the fastener extends through the support member aperture and the boss aperture and the fastening member is engaged with the fastening section.

Example 19: A method comprising: placing a rotor drive key comprising a support member around a wheel boss of a vehicle wheel; extending a fastener in an axial direction of the wheel through a boss aperture defined by the wheel boss and a support aperture defined by the support member until a fastening section of the fastener extends beyond the support member; and engaging a fastening member with the fastening section.

Example 20: The method of example 19, wherein placing the rotor drive key around the wheel boss comprises surrounding the wheel boss with a trough defined by the rotor drive key, and the method further comprising placing the fastening member within the trough.

Various examples have been described. These and other examples are within the scope of the following claims.

What is claimed is:
1. An assembly comprising:
a rotor drive key configured to be positioned over a wheel boss of a wheel, wherein the rotor drive key defines a support member;
a fastener configured to extend through the wheel boss and the support member in a substantially axial direction of the wheel when the rotor drive key is positioned over the wheel boss, wherein a fastening section of the fastener extends beyond the support member when the fastener extends through the wheel boss and the support member; and
a fastening member configured to engage with the fastening section,
wherein the rotor drive key defines a trough configured to surround at least some part of the fastening member when the fastener extends through the support member and the fastening member engages the fastening section, and wherein the fastening member comprises an arm configured to extend outside of the trough when the fastener extends through the support member and the fastening member engages the fastening section.

2. The assembly of claim 1, wherein the fastening member is configured to threadably engage with the fastening section.

3. The assembly of claim 1, wherein the arm is a first arm and the fastening member comprises a second arm extending in a substantially opposite direction from the first arm, wherein the second arm is configured to extend outside of the trough when the fastener extends through the support member and the fastening member engages the fastening section.

4. The assembly of claim 1, wherein the rotor drive key is configured to cantilever from one or more of the fastener, the fastening member, the wheel boss, or the support member in the substantially axial direction of the wheel when the rotor drive key is positioned over the wheel boss and the fastener extends through the wheel boss and the support member.

5. The assembly of claim 1, wherein the fastening member comprises a first side and a second side opposite the first side, and wherein the rotor drive key is configured to contact the first side and the second side when the fastener extends through the support member and the fastening member engages the fastening section.

6. The assembly of claim 1, wherein the fastening member comprises a member bearing surface and the support member comprises a support bearing surface, and wherein the member bearing surface is configured to contact the support bearing surface when the fastener extends through the support member and the fastening member engages the fastening section.

7. The assembly of claim 1, further comprising the wheel defining an interior surface and comprising the wheel boss along the interior surface, wherein:

the wheel boss defines a boss aperture, and the support member defines a support member aperture, wherein, when the rotor drive key is positioned over the wheel boss, the fastener is configured to extend through the boss aperture and the support member aperture, and wherein the support member aperture is configured to be aligned with the boss aperture when the fastener extends through the boss aperture and the support member aperture.

8. The assembly of claim 1, further comprising the wheel defining an interior surface and comprising the wheel boss along the interior surface, wherein the wheel boss comprises a pair of opposite sides, and wherein the rotor drive key defines a trough configured to surround at least some portion of each of the opposite sides when the rotor drive key is positioned over the wheel boss.

9. The assembly of claim 1, further comprising a locking mechanism configured to rotationally lock the fastener relative to the rotor drive key when the fastener extends through the support member and the fastening member engages the fastening section.

10. The assembly of claim 1, wherein the arm is configured to substantially limit movement of a heat shield in a substantially axial direction of the wheel.

11. The assembly of claim 1, wherein:

the support member defines a first bearing surface and a second bearing surface opposite the first bearing surface, the fastening member defines a member bearing surface, and the first bearing surface is configured to contact the wheel boss when the member bearing surface contacts the second bearing surface.

12. An assembly comprising:

a vehicle wheel comprising a wheel boss defining a boss aperture;

a rotor drive key configured to position over the wheel boss, wherein the rotor drive key comprises a support member defining a support member aperture configured to align with the boss aperture in a substantially axial direction of the wheel;

a fastener comprising a fastener head at a first end and fastening section at a second end, the fastener configured to extend through the boss aperture and the support member aperture such that the wheel boss is in between fastener head and the support member, and such the fastening section extends beyond the support member aperture; and a fastening member configured to engage with the fastening section to secure the fastener in place relative to the rotor drive key, wherein the rotor drive key defines a trough configured to surround at least some part of the fastening member when the rotor drive key is positioned over the wheel boss and the fastener extends through the support member aperture and the boss aperture, and wherein the fastening member comprises an arm configured to extend outside of the trough when the rotor drive key is positioned over the wheel boss, the fastener extends through the support member aperture and the boss aperture, and the fastening member is engaged with the fastening section.

13. The assembly of claim 12, wherein the rotor drive key is cantilevered from one or more of the fastener, the fastening member, the wheel boss, or the support member in a substantially axial direction of the vehicle wheel.

14. The assembly of claim 12 further comprising a heat shield conforming to an interior surface of the wheel, wherein the arm is configured to substantially limit movement of the heat shield in a substantially axial direction of the wheel.

15. The assembly of claim 12, wherein the fastening member is configured to threadably engage with the fastening section.

16. The assembly of claim 12, further comprising a locking mechanism configured to rotationally lock the fastener relative to the rotor drive key when the fastener extends through the support member aperture and the boss aperture and the fastening member is engaged with the fastening section.

17. The assembly of claim 12, wherein the fastening member comprises a first side and a second side opposite the first side, and wherein the rotor drive key is configured to contact the first side and the second side when the fastener extends through the support member aperture and the boss aperture and the fastening member is engaged with the fastening section.

18. The assembly of claim 12, wherein:

the support member defines a first bearing surface and a second bearing surface opposite the first bearing surface, the fastening member defines a member bearing surface, and the first bearing surface is configured to contact the wheel boss when the member bearing surface contacts the second bearing surface.

19. A method comprising:

placing a rotor drive key comprising a support member around a wheel boss of a vehicle wheel;

extending a fastener in an axial direction of the wheel through a boss aperture defined by the wheel boss and a support aperture defined by the support member until a fastening section of the fastener extends beyond the support member; and engaging a fastening member surrounded at least partially by a trough defined by the rotor drive key with the fastening section such that an arm of the fastening member extends outside of the trough when the fastener extends through the boss aperture and the support aperture.

20. The method of claim 19, wherein placing the rotor drive key around the wheel boss comprises surrounding the wheel boss with the trough defined by the rotor drive key, and the method further comprising placing the fastening member within the trough.

\* \* \* \* \*